United States Patent
Nogin et al.

(10) Patent No.: US 10,691,282 B2
(45) Date of Patent: Jun. 23, 2020

(54) HIGH-ASSURANCE NETWORK GATEWAY GENERATORS

(71) Applicant: HRL Laboratories, LLC, Malibu, CA (US)

(72) Inventors: Aleksey Nogin, Fresno, CA (US); Michael A. Warren, Northridge, CA (US); Gavin D. Holland, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/034,244

(22) Filed: Jul. 12, 2018

(65) Prior Publication Data

US 2020/0034539 A1   Jan. 30, 2020

Related U.S. Application Data

(60) Provisional application No. 62/557,975, filed on Sep. 13, 2017.

(51) Int. Cl.
*G06F 17/30* (2006.01)
*G06F 3/048* (2013.01)
*G06F 40/174* (2020.01)

(52) U.S. Cl.
CPC ............ *G06F 3/048* (2013.01); *G06F 40/174* (2020.01)

(58) Field of Classification Search
CPC ....... H01L 35/30; H04L 12/66; H04L 45/306; H04W 48/16; G06F 17/30
See application file for complete search history.

(56) References Cited

U.S. PATENT DOCUMENTS

| | | |
|---|---|---|
| 9,182,961 B1 | 11/2015 | Tolle |
| 2003/0135842 A1 | 7/2003 | Frey et al. |
| 2004/0148588 A1 | 7/2004 | Sadiq |
| 2006/0179426 A1 | 8/2006 | Koo et al. |

(Continued)

OTHER PUBLICATIONS

Chlipala, A. (2013). The Bedrock Structured Programming System. Proceedings of the 18th ACM SIGPLAN International Conference on Functional Programming, pp. 391-402, New Yrok: ACM.

(Continued)

*Primary Examiner* — Lan-Huong Truong
(74) *Attorney, Agent, or Firm* — Tope-McKay & Associates

(57) ABSTRACT

Described is a high-assurance network gateway generator that generates and encodes network gateway code on a computer readable medium. In operation, the network gateway generator receives input artifacts, which are translated into corresponding formats as translated data. The translated data is distributed to an OS code generator, a glue code generator, and a communications code generator. The OS code generator then generates OS code based on the translated data. The communications code generator proceeds to generate deserialization and filtering code based on the translated data. Further, a glue code generator generates glue code based on the OS code and translated data. An executable network gateway code is then generated by combining the glue code, deserialization code, and filtering code. Finally, the executable network gateway code is then encoded on a computer readable medium.

12 Claims, 4 Drawing Sheets

(56) References Cited

U.S. PATENT DOCUMENTS

2010/0280865 A1* 11/2010 Goja ............... G06Q 10/06
                                                    705/7.27
2010/0281462 A1* 11/2010 Festa ............... G06F 8/34
                                                    717/108
2016/0328216 A1   11/2016 Leonelli et al.

OTHER PUBLICATIONS

Kuz, I., Liu, Y., Gorton, I., & Heiser, G. (2007). CAmkES: A component model for secure microkernel-based embedded systems. Journal of Systems and Software, pp. 687-699.

Ni, Z., & Shao, Z. (2006). Certified assembly programming with embedded code pointers. Proc. Popl, pp. 320-333, New York: ACM.

SEI CERT. (2016). SEI CERT C Coding Standard. Pittsburgh, PA: Carnegie Mellon University, pp. 1-534.

Sewell, T., Myreen, M., & Klein, G. (2013). Translation Validation for a Verified OS Kernel. Proceedings of the 34th ACM Sigplan Conference on Programming Language Design and Implementation, pp. 471-482, New York: ACM.

Nyk, K. v. (2013). Adapting Penetration Testing for Software Development Purposes (2013 revision ed.). Pittsburgh, PA: Carnegie Mellon University, pp. 1-27.

Notification of Transmittal of International Search Report and the Written Opinion of the International Searching Authority for PCT/US2018/041902; dated Nov. 23, 2018.

International Search Report of the International Searching Authority for PCT/US2018/041902; dated Nov. 23, 2018.

Written Opinion of the International Searching Authority for PCT/US2018/041902; dated Nov. 23, 2018.

International Preliminary Report on Patentability Chapter II for PCT/US2018/041902; dated Sep. 10, 2019.

* cited by examiner

HIGH-ASSURANCE NETWORK GATEWAY GENERATORS

CROSS-REFERENCE TO RELATED APPLICATIONS

This application claims the benefit of and is a non-provisional patent application of U.S. 62/557,975, filed on Sep. 13, 2017, the entirety of which is hereby incorporated by reference.

GOVERNMENT RIGHTS

This invention was made with government support under U.S. Government Contract Number FA8750-12-C-0281 HACMS-TACMS. The government has certain rights in the invention.

BACKGROUND OF INVENTION

(1) Field of Invention

The present invention relates to a network gateway and, more specifically, to a high-assurance network gateway generator.

(2) Description of Related Art

This disclosure is directed to network gateway generators. Such a gateway mediates traffic between a platform (e.g., a vehicle ECU, the internal computer stack of a robot, etc.) and a network (e.g., IP network, CAN network, etc.). Current practice for the construction of network gateways for systems which are required to be safe and secure heavily leverage a combination of software and systems engineering best practices (see the List of Incororpated Literature References, Literature Reference Nos. 4 and 6), together with penetration testing (see Literature Reference No. 8). While all three of these approaches are valuable, they fail to provide the kind of mathematical guarantees provided by the high-assurance approach. Engineering best practices help to decrease the number of potential vulnerabilities, while penetration testing helps to identify existing vulnerabilities.

Although the prior art does provide some security, existing techniques are unable to guarantee that certain vulnerabilities are definitively (100%) not present. This kind of guarantee cannot be provided by the prior art for computational reasons: testing relies on examining a (small) subset of the total number of possible system states and behaviors, and for even a small system there are sufficiently many potential states and behaviors that complete coverage by testing cannot be achieved. Likewise, best practices can only go so far in eliminating errors on sufficiently complex systems.

Thus, a continuing need exists for a methodology for and implementations of high-assurance network gateway generators that mediate traffic between a platform and a network in a high-assurance manner.

SUMMARY OF INVENTION

This disclosure provides a high-assurance network gateway generator that generates and encodes network gateway code on a computer readable medium. The network gateway generator includes one or more processors and a memory. The memory is a non-transitory computer-readable medium having executable instructions encoded thereon, such that upon execution of the instructions, the one or more processors perform several operations. In operation, the network gateway generator receives input artifacts, which are translated into corresponding formats as translated data. The translated data is distributed to an OS code generator, a glue code generator, and a communications code generator. The OS code generator then generates OS code based on the translated data. The system architecture is also captured, including communications channels between trusted and untrusted subsystems. The communications code generator proceeds to generate deserialization and filtering code based on the translated data. Further, a glue code generator generates glue code based on the OS code and translated data. An executable network gateway code is then generated by combining the glue code, deserialization code, and filtering code. Further, where applicable, proof artifacts are generated providing mathematical guarantees on an impossibility of untrusted subsystems interfering with trusted subsystems and an impossibility of exploitable failures in message serialization and deserialization code for communications. The executable network gateway code is encoded on a computer readable medium. A gateway can then be formed between a platform and network by running the executable network gateway code on a network server. Finally, communication traffic is facilitated between the platform and network through the gateway such that it is impossible for untrusted subsystems accessible via the network to alter or modify contents of trusted subsystems except the contents of designated communications channels, and such that there are no exploitable failures (e.g., buffer overflows, undefined behaviors resulting from parsing malformed inputs) present in the communications channels.

In another aspect, the translated data includes system architecture code, glue code relevant artifacts, and message specifications.

In yet another aspect, the communications code generator further generates formal specifications, proofs, and associated code.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
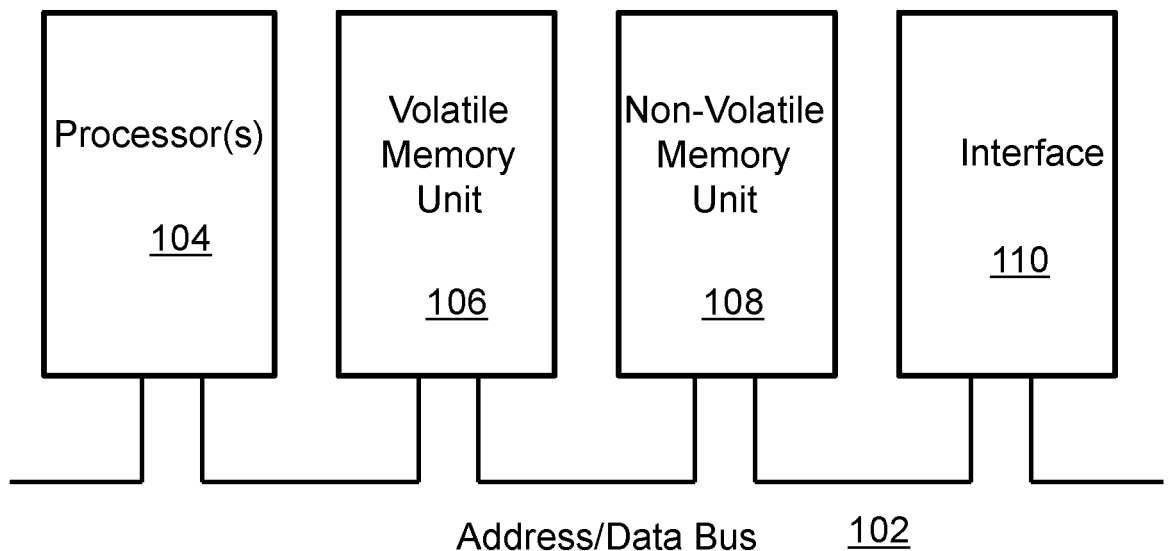
FIG. 1 is a block diagram depicting the components of a system according to various embodiments of the present invention.
Figure 1:
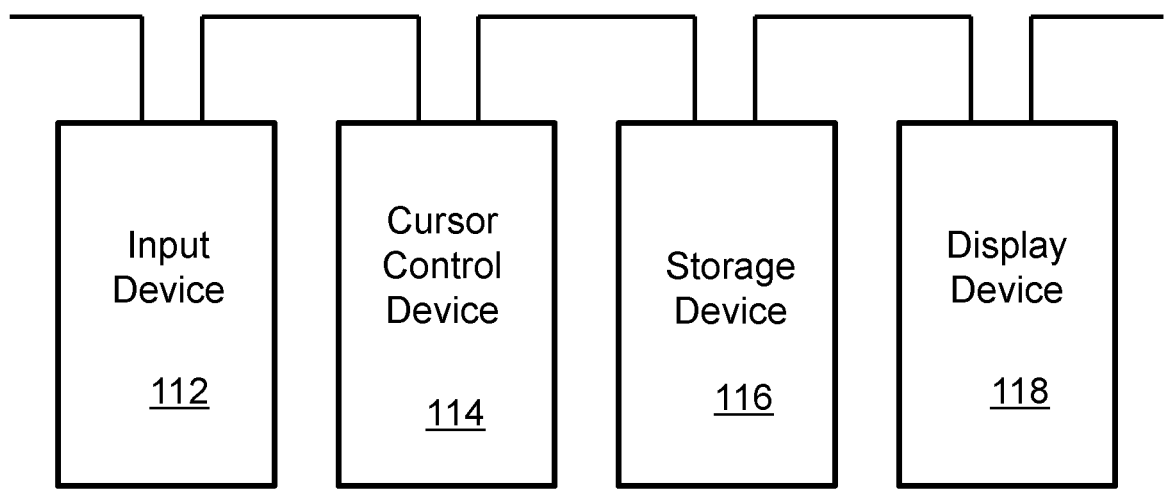

The present invention relates to a network gateway and, more specifically, to a high-assurance network gateway generator. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Chlipala, A. (2013). The Bedrock Structured Programming System. *Proceedings of the 18th ACM SIGPLAN International Conference on Functional Programming* (pp. 391-402). New Yrok: ACM.
2. Feiler, P. H., & Gluch, D. P. (2012). *Model-Based Engineering with AADL*. Indianapolis, Ind.: Addison-Wesley Professional.
3. Kuz, I., Liu, Y., Gorton, I., & Heiser, G. (2007). CAmkES: A component model for secure microkernel-based embedded systems. *Journal of Systems and Software*, pp. 687-699.
4. NASA. (2007). *Systems Engineering Handbook*. Washington, D.C.: NASA Center for AeroSpace Information.
5. Ni, Z., & Shao, Z. (2006). Certified assembly programming with embedded code pointers. *Proc. POPL* (pp. 320-333). New York: ACM.
6. SEI CERT. (2016). *SEI CERT C Coding Standard*. Pittsburgh, Pa.: Carnegie Mellon University.
7. Sewell, T., Myreen, M., & Klein, G. (2013). Translation Validation for a Verified OS Kernel. *Proceedings of the 34th ACM SIGPLAN Conference on Programming Language Design and Implementation* (pp. 471-482). New York: ACM.
8. Wyk, K. v. (2013). *Adapting Penetration Testing for Software Development Purposes* (2013 revision ed.). Pittsburgh, Pa.: Carnegie Mellon University.

(2) PRINCIPAL ASPECTS

Various embodiments of the invention include three "principal" aspects. The first is a system for generating a high-assurance network gateway. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
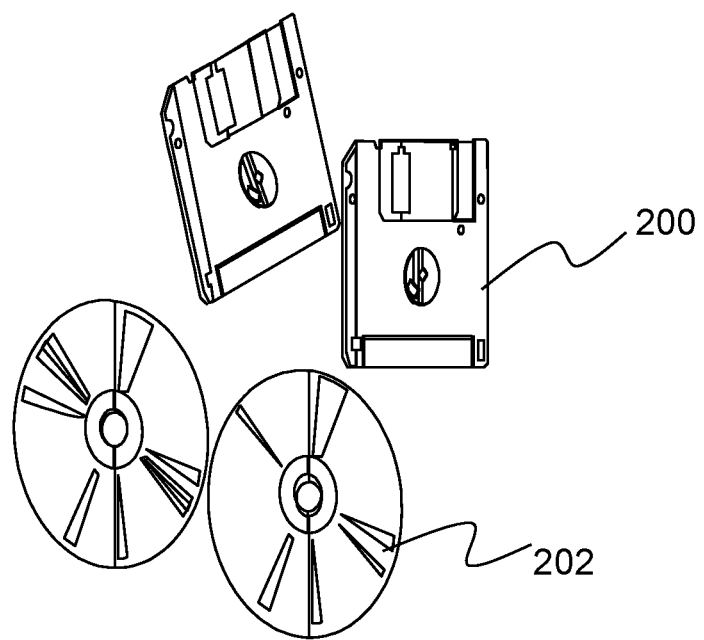
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

As noted above, this disclosure is directed to network gateway generators. More specifically, this disclosure provides a methodology for and implementations of high-assurance network gateway generators through use of a communication code generator that generates code that is mathematically impossible to break and provides documentation ("artifacts") to this effect. Such a gateway mediates traffic between a platform (e.g., a vehicle ECU, the internal computer stack of a robot, etc.) and a network (e.g., IP network, CAN network, etc.) in a high-assurance way. High-assurance means that isolation properties of the system are strictly enforced and that additional component and glue code is automatically generated in such a way as to avoid error and vulnerability. Furthermore, it is assumed that generated component and glue code has either already been or is readily capable of being formally verified to satisfy additional security and safety conditions (e.g., no buffer overflows, etc.). The gateway itself is to be generated from a concise collection of formal artifacts which capture system properties and constraints (e.g., filtering of CAN packets by ID, rates at which message packets should be transmitted, etc.). A unique aspect of this disclosure is in the approach taken to making the gateway high-assurance.

Some advantages of a high-assurance gateway over a conventional gateway are as follows. First, the isolation properties enforced by the high-assurance gateway ensure that although un-trusted component code (e.g., legacy Linux code in a VM) may be capable of receiving or sending data across the gateway, it cannot escape the region into which it is isolated (in the example, the VM component) to affect critical system components. For example, compromised component code for a car's infotainment system would be unable to affect the crucial vehicle functions such as braking or acceleration. Second, by capturing core system parameters and properties in formal artifacts and generating the gateway code from these artifacts the chances of programmer error that could lead to security or safety issues are minimized. For example, without this approach, when the set of CAN messages that need to be handled by the system are changed, an engineer would have to make changes by hand to code scattered across the code-base. For even a moderately complex system (orders of magnitude simpler than an automobile or airplane) this could mean changes to hundreds of lines of code. Third, when component code is generated in such a way that proofs of its correctness are also generated, this dramatically increases the security and safety of the system: it gives mathematical guarantees that those components behave according to the specifications. For example, component code related to message (de)serialization (i.e., converting messages from one bit- or byte-format to another) can be generated together with proofs that these routines do not exceed the message buffer bounds, thereby ensuring the absence of buffer overflows in this code. Previous approaches to the construction of gateway code might get the second point here right, but the presence of the first and third points in this case yields a dramatic increase in the security and safety of the resulting system.

High-assurance gateway generation is relevant to any platform that should provide safety or security guarantees and contains a network component. In particular, both plane, unmanned aerial vehicles, and automobile platforms are ideal targets for this technology.

(4) SPECIFIC DETAILS OF VARIOUS EMBODIMENTS

Provided below is a description of the methodology for generating high-assurance network gateways, following by specific example implementations of such a methodology.

At the high-level, a platform and a network to which the platform is connected are assumed. There is no reason to restrict to a single network and this restriction is only for purposes of illustration. Given formal artifacts are also assumed describing subsets of the message packets that are to be transmitted on or received from the network by the platform. The artifacts may also record additional parameters or settings relevant to the code generation, but in this high-level overview these details are omitted. This is an idealized setting suitable for summarizing this approach, but details in actual implementations are given below. From this data, the following is generated:
1. Ambient operating system specific code for the gateway component and rest of the system.
2. Serialization and deserialization code for messages.
3. Individual component "glue" code for the gateway component and any additional components that are inferred from the formal artifacts or required by the tool itself
4. Proof artifacts.

These outputs are required to be sufficiently high-assurance that the earlier claims regarding benefits over prior art are valid. In particular, it is assumed that the operating system level code (1) should strongly enforce isolation and other correctness criteria. Additionally, (2) and (3) should either be supplied with proofs of correctness or else be designed in such a way as to be easily verified post hoc by existing verification tools. As an intermediary stage, high-level system requirements are always translated into the *Architecture Analysis and Design Language* (AADL) (see Literature Reference No. 2), which provides an abstract architecture focused view of the system design that is useful for driving some of the code generation. Among other things, the glue code (3) is responsible for the details of receiving packets P from the network, performing any unpacking, sanitization and checking necessary (e.g., cryptographic functions) before calling deserialization code (2) and passing the resulting message to other system components via additional glue code (3). For transmitting packets on the network this procedure is reversed. Thus, the resulting system handles network communication by the platform and any additional component code (e.g., control code) is not covered by this procedure and must be provided by other means. The proof artifacts (4) provide the mathematical justification for the claim of high-assurance. Further details are provided below and illustrated in FIG. 3.

Figure 3:
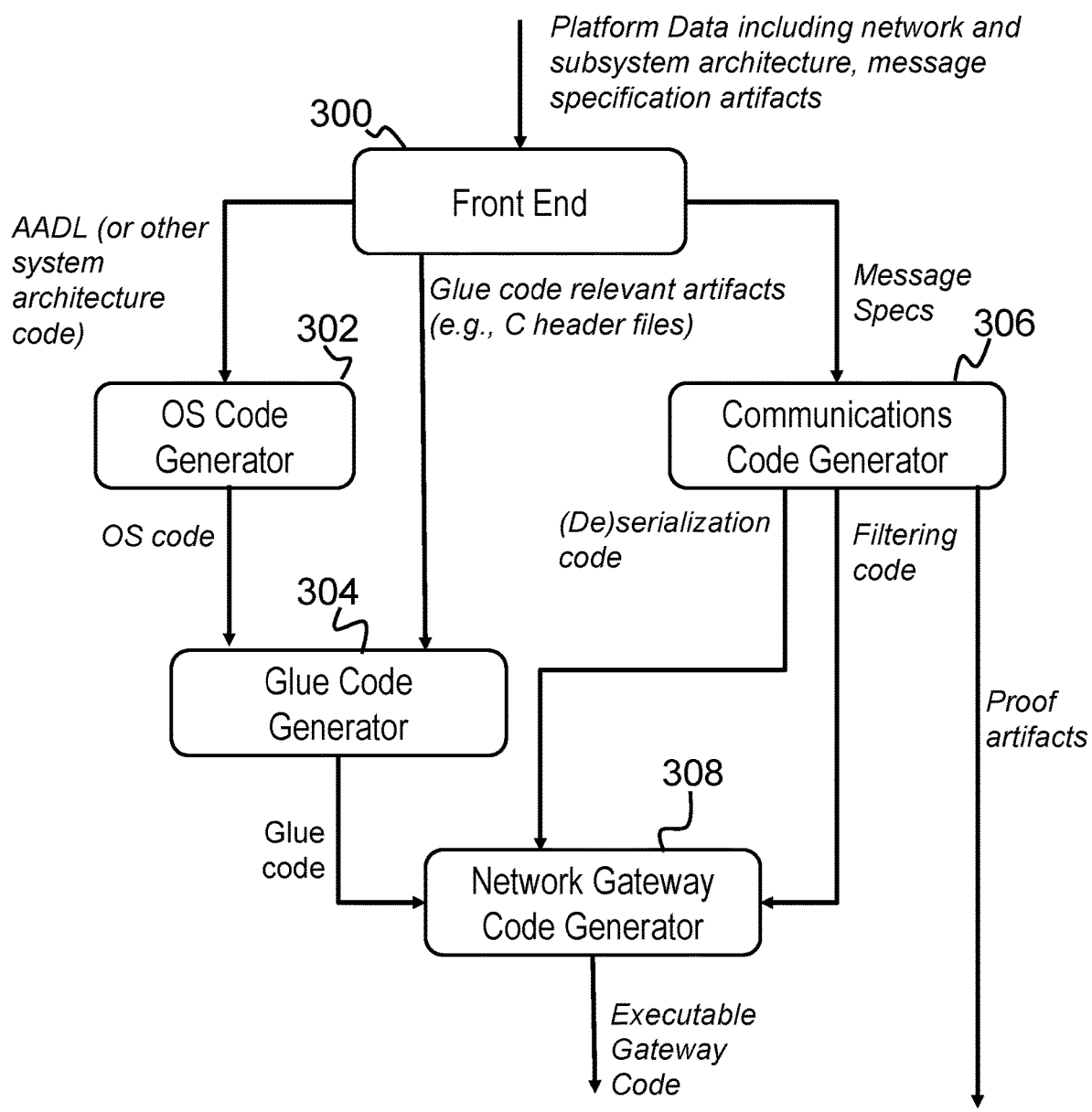
FIG. 3 is a flowchart depicting a process according to various embodiments of the present invention.

As shown in FIG. 3, a front end 300 receives input artifacts including subsystem architecture and message specification artifacts. The subsystem architecture describes the interconnections between the constituent subsystem modules. For example, in the case of the internal network of an automobile, the subsystem architecture could describe features such as an interconnection between the infotainment system and one or more engine control units (ECUs) on the vehicle. In the case of an infrastructure information technology (IT) system, the subsystem architecture could capture features such as the way in which various servers are connected via Ethernet network hardware. On a single machine, the subsystem architecture could capture the fact that there should be a component which is running untrusted third-party code in a linux virtual machine and that that virtual machine will communicate with a trusted system component that parses message packets and forwards them to further processes. Additionally, message specification artifacts capture descriptions, in terms of the data structures to be communicated, of the kinds of messages that are to be transmitted between the various system components and external networks. For example, see the description of robot operating system (ROS) messages provided below.

The front end 300 parses artifacts and translates them into corresponding formats (e.g., mapping architecture descriptions to AADL or converting .dbc descriptions of CAN messages to corresponding OCaml data structures). The front end 300 also distributes the translated data to the OS code generator 302, the glue code generator 304, and the communications code generator 306. This is done with standard lexicographic analysis and parsing techniques as understood by those skilled in the art.

Each of the OS code generator 302 and communications code generator 306 produce high-assurance output code. For Example, the OS Code generator 302 consumes AADL (or alternative format) architecture description and produces corresponding OS code for running on high-assurance microkernel (e.g., seL4). An example of the the OS code generator 302 is provided in further detail below regarding CAmkES (see Literature Reference No. 3) and the Trusted Build tool. The isolation properties required to be considered high-assurance are a consequence of the choice of high-assurance microkernel together with the communications mechanisms utilized (see below).

Further, the communications code generator 306 consumes message specs which describe the types of messages to be handled by the gateway and any further information (e.g., filtering rules). It then produces, via string processing methods (as clearly understood by those skilled in the art), (de)serialization and filtering code.

Additionally, and crucially, the communications code generator 306 also produces formal specifications, proofs, and associated code (e.g., in the Coq proof assistant) that combine to yield the low-level correctness guarantees required of high-assurance software. The formal specifications are produced either by instantiating high-level abstract specifications (Coq dependent types) at the concrete message type instances or by standard string processing methods that produce specifications corresponding to the message type artifacts supplied. Several examples are discussed below. The proofs themselves can be generated directly from specifications via automated procedures such as SMT solving, using existing library tactics, by raw string manipulation (together with meta-programming), or by a combination of these techniques. The associated code is generated either using code synthesis tools or via standard string manipulation techniques. Examples are provided below. That the proofs should be automatically generated together with the code is a crucial feature of the process described herein.

The glue code generator 304 consumes OS code and component code (e.g., C headers, cryptography code) and outputs an intermediate form of the code (i.e., glue code; this still requires the communications code in order to compile and run). As above, this involves some combination of metaprogramming and string manipulation algorithms. Examples of glue code generation are provided in further detail below.

Finally, a network gateway code generator 308 combines the glue code and communications code and compiles into executable network gateway code. Combining and compiling the glue code and communications code into a single executable code is a common procedure as understood by those skilled in the art. For example, standard build tools such as GNU make provide automation for precisely this purpose. Several existing implementations of this methodology that have been constructed are described in further detail below.

The platform in the first implementation that is considered is a small tracked research robot (GVR-BOT) coming from the US Army Tank Automotive Research Development and Engineering Center (TARDEC). In this case, and the other case considered below, the underlying operating system is seL4, which has been formally verified down to the binary level (see Literature Reference No. 7). Among other things, the isolation properties of seL4 have been verified. In the case of the GVR-BOT, it has both wireless Ethernet communication (UDP) to an external machine (the OCU), as well as an internal connection to a Linux VM which is running as an seL4 component. In this case, there was actually further gateway code handling the internal connection between the VM and the other seL4 components, but understanding this is not necessary to understand the basic illustration provided by the Ethernet gateway.

Figure 4:
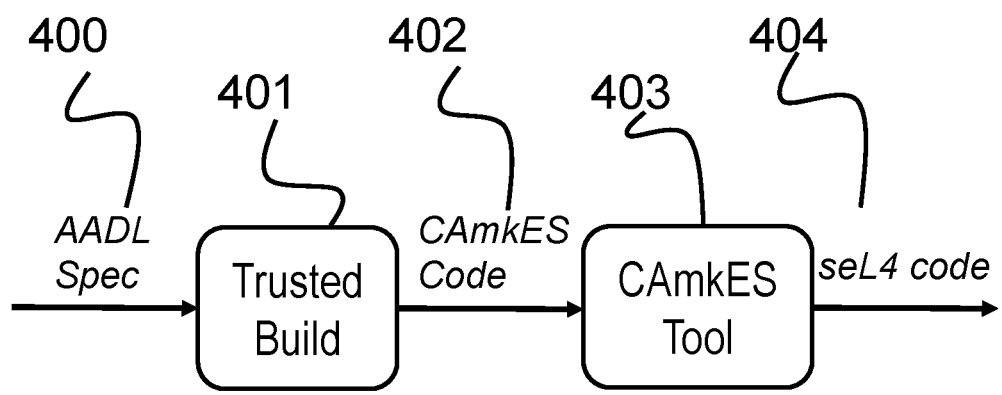
FIG. 4 is an illustration of the procedure utilizing the Trusted Build and CAmkES tools.

As noted above, CAmkES (see Literature Reference No. 3) and the Trusted Build tool are provided as an example of the OS code generator. For example, on top of the underlying seL4 APIs, there is an architecture level description system called CAmkES and the Trusted Build tool. The Trusted Build tool is an open source tool developed by the University of Minnesota and Rockwell Collins. Improvements as requested by developers were incorporated into the code to generate CAmkES code from AADL. In addition to CAmkES code, Trusted Build is able to synthesize additional code from AADL specs, such as C structures corresponding to AADL message types. Therefore, the entry-point to the code generation process was in large part the AADL level (as indicated above). An example implementation is depicted in FIG. 4, which provides a schematic illustration of the procedure. As shown, the Trusted Build is 401 used to generate the CAmkES code 402, after which a CAmkES tool 403 generates the seL4 code 404.

As noted above, the communications code generator 306 produces formal specifications, proofs, and associated code that combine to yield the low-level correctness guarantees required of high-assurance software. Examples of communications code generators are as follows. The basic message format this was concerned with on the GVR-BOT is the Robot Operating System (ROS) message format (.msg). Each (non-space, non-comment) line of a .msg file is either a constant declaration (these are ignored as they do not enter into the discussion) or a field declaration line of the form field_type field_name where field_type is one of:
    A primitive type:
        Booleans
        Signed and unsigned 8-, 16-, 32- or 64-bit integers
        32- and 64-bit floating point numbers
        ASCII string
        Time or duration types
    Imported types from other .msg files
    Fixed- or variable-length arrays of field types
    Special "header" type.

An additional example of the communications code generator includes the code generation tool (ros2seL4). The code generation tool (ros2seL4) is written in the OCaml programming language and takes as input both a stock of .msg files (including a pointer to the ROS standard library .msg files) and a .ros file. The .ros format is a custom format is employed to drive the code generation and it specifies which messages are to be transmitted from the robot along the Ethernet connection and which are to be received from it, as well as several other book-keeping related settings. The tool outputs are:

AADL message type definitions corresponding to the
        ROS message definitions.
    C gateway component code (for GVR-BOT).
    C++ gateway component code (for OCU).
    Message (de)serialization code.

The C gateway code, as in the high-level summary above, performs the basic tasks of receiving and sending UDP packets, including use of cryptographic functions on the packet payloads as well as (de)serialization. The C++ code does roughly the same and also interfaces with the ROS system.

Examples of generation of proofs and message handling code is as follows. The message (de)serialization code that is produced by the tool code in the Bedrock programming language (see Literature Reference No. 1). Bedrock is an abstract assembly language embedded in the Coq proof assistant. In addition to the actual programming language itself, Bedrock includes a specification language and a logic for verifying that programs meet their specifications. The logic is a form of separation logic building on the XCAP logic of (see Literature Reference No. 5). The embedding in Coq provides a rich meta-programming and theorem proving environment. Part of the novelty of Bedrock, as an embedded language in a proof assistant, is that the code can be compiled: by a process which first extracts OCaml string manipulation code and then via a series of shell scripts, the Bedrock assembly is transformed into IA32 (or AMD64) in GAS syntax. In this case, a series of specifications and proof tactics for (de)serialization of ROS messages was hand-written. The ros2seL4 tool then produces the actual Bedrock code of the (de)serializers and sends appropriate parameters to the specs. The tactics are then capable of deriving proofs of that the generated code matches these specs. The specs guarantee that the (de)serialization code does not read or write past the correct buffer boundaries. There is also generated code that (de)allocates memory on the Bedrock heap that is used in order to interface with the generated C(++) code. This tool also generates corresponding C headers and assembly code wrappers for the (de)serializers.

The second platform a high-assurance gateway generator was implemented on is a large, autonomous military convoy truck (a AMAS HET), also from TARDEC. On this platform, there were a number of network interfaces, but the one of most interest from the perspective of this disclosure was the CAN network on which J1939 packets were handled. In this case, the formal artifacts that were considered were .dbc files and .can files. The .dbc format is widely used to describe the signals constituting messages transmitted as CAN frames. Various properties of messages and signals are captured in this format including: bit offsets and lengths of signals within frames, value scaling and translation, endianness of encoding, etc. The .can format, like the .ros format above, is a custom file format that was developed to capture the relevant information regarding which signals should be received or transmitted by the main platform computer, as well as various additional features such as: CAN ID (in case it doesn't match the one in the .dbc file), default values for different control modes, etc.

The tool that was developed (mastodon) parses .dbc and .can files and produces corresponding code:
AADL code.
C gateway component code.
Message (de)serialization code.

There are several differences between this case and the GVR-BOT case considered above. First, the (de)serializers in this case are not Bedrock code themselves. The reason for this is that Bedrock does not currently, in its abstract assembly language, handle floating-point assembly code, but the (de)serialization of floating-point signals in many cases requires the use of floating-point arithmetic (to handle the translation and scaling by floating-point values). In this case, a Bedrock library of basic CAN frame handling routines were developed and compiled it to assembly. Routines from this code are then called by the generated C (de)serialization code, but all floating-point arithmetic is handled in C. The second difference is that AADL code in this case also captures the routing of messages on the vehicle. In particular, in collaboration with researchers at Princeton University a mailbox protocol for communications on the platform was developed and the developers of Trusted Build extended that system to enable mailbox connections to be generated from the AADL. Therefore, this mailbox protocol was able to be used for the gateway: e.g., the gateway receives a J1939 message, it strips out the relevant signals, packages the signal values in a C structure and puts them in the appropriate mailbox.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A network gateway generator, comprising:
one or more processors and a memory, the memory being a non-transitory computer-readable medium having executable instructions encoded thereon, such that upon execution of the instructions, the one or more processors perform operations of:
receiving input artifacts;
translating the input artifacts into corresponding formats as translated data;
distributing the translated data to an operating system (OS) code generator, a glue code generator, and a communications code generator;
generating, by the OS code generator, OS code based on the translated data, and capturing the system architecture, including communications channels between trusted and untrusted subsystems;
generating, by the communications code generator, deserialization and filtering code based on the translated data;
generating, by a glue code generator, glue code based on the OS code and translated data;
generating an executable network gateway code by combining the glue code, deserialization code, and filtering code;
generating proof artifacts providing mathematical guarantees on an impossibility of untrusted subsystems interfering with trusted subsystems and an impossibility of exploitable failures in message serialization and deserialization code for communications;
encoding the executable network gateway code on a computer readable medium;
forming a gateway between a platform and network by running the executable network gateway code on a network server; and
facilitating communication traffic between the platform and network through the gateway such that it is impossible for untrusted subsystems accessible via the network to alter or modify contents of trusted subsystems except the contents of designated communications channels, and such that there are no exploitable failures present in the communications channels.

2. The network gateway generator as set forth in claim 1, wherein the translated data includes system architecture code, glue code relevant artifacts, and message specifications.

3. The network gateway generator as set forth in claim 2, wherein the communications code generator further generates formal specifications, proofs, and associated code.

4. The network gateway generator as set forth in claim 1, wherein the communications code generator further generates formal specifications, proofs, and associated code.

5. A computer program product for a network gateway generator, the computer program product comprising:
a non-transitory computer-readable medium having executable instructions encoded thereon, such that upon execution of the instructions by one or more processors, the one or more processors perform operations of:
receiving input artifacts;

translating the input artifacts into corresponding formats as translated data;
distributing the translated data to an operating system (OS) code generator, a glue code generator, and a communications code generator;
generating, by the OS code generator, OS code based on the translated data, and capturing the system architecture, including communications channels between trusted and untrusted subsystems;
generating, by the communications code generator, deserialization and filtering code based on the translated data;
generating, by a glue code generator, glue code based on the OS code and translated data;
generating an executable network gateway code by combining the glue code, deserialization code, and filtering code;
generating proof artifacts providing mathematical guarantees on an impossibility of untrusted subsystems interfering with trusted subsystems and an impossibility of exploitable failures in message serialization and deserialization code for communications;
encoding the executable network gateway code on a computer readable medium;
forming a gateway between a platform and network by running the executable network gateway code on a network server; and
facilitating communication traffic between the platform and network through the gateway such that it is impossible for untrusted subsystems accessible via the network to alter or modify contents of trusted subsystems except the contents of designated communications channels, and such that there are no exploitable failures present in the communications channels.

6. The computer program product as set forth in claim 5, wherein the translated data includes system architecture code, glue code relevant artifacts, and message specifications.

7. The computer program product as set forth in claim 6, wherein the communications code generator further generates formal specifications, proofs, and associated code.

8. The computer program product as set forth in claim 5, wherein the communications code generator further generates formal specifications, proofs, and associated code.

9. A computer implemented method for a network gateway generator, the method comprising an act of:
causing one or more processors to execute instructions encoded on a non-transitory computer-readable medium, such that upon execution, the one or more processors perform operations of:
receiving input artifacts;
translating the input artifacts into corresponding formats as translated data;
distributing the translated data to an operating system (OS) code generator, a glue code generator, and a communications code generator;
generating, by the OS code generator, OS code based on the translated data, and capturing the system architecture, including communications channels between trusted and untrusted subsystems;
generating, by the communications code generator, deserialization and filtering code based on the translated data;
generating, by a glue code generator, glue code based on the OS code and translated data;
generating an executable network gateway code by combining the glue code, deserialization code, and filtering code;
generating proof artifacts providing mathematical guarantees on an impossibility of untrusted subsystems interfering with trusted subsystems and an impossibility of exploitable failures in message serialization and deserialization code for communications;
encoding the executable network gateway code on a computer readable medium;
forming a gateway between a platform and network by running the executable network gateway code on a network server; and
facilitating communication traffic between the platform and network through the gateway such that it is impossible for untrusted subsystems accessible via the network to alter or modify contents of trusted subsystems except the contents of designated communications channels, and such that there are no exploitable failures present in the communications channels.

10. The method as set forth in claim 9, wherein the translated data includes system architecture code, glue code relevant artifacts, and message specifications.

11. The method as set forth in claim 10, wherein the communications code generator further generates formal specifications, proofs, and associated code.

12. The method as set forth in claim 9, wherein the communications code generator further generates formal specifications, proofs, and associated code.

* * * * *